(No Model.)
C. M. CONRADSON.
SECTIONAL JOURNAL BOX.
No. 459,627. Patented Sept. 15, 1891.
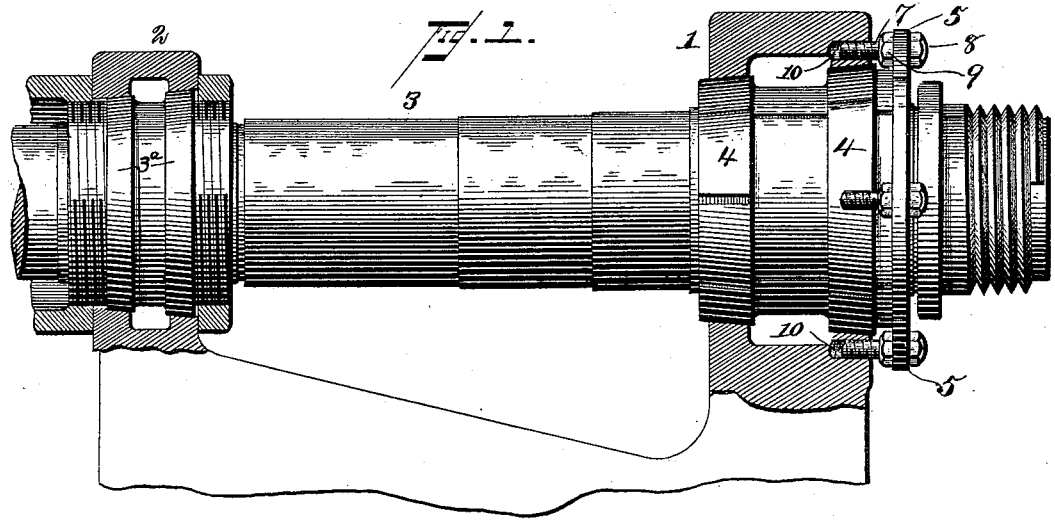
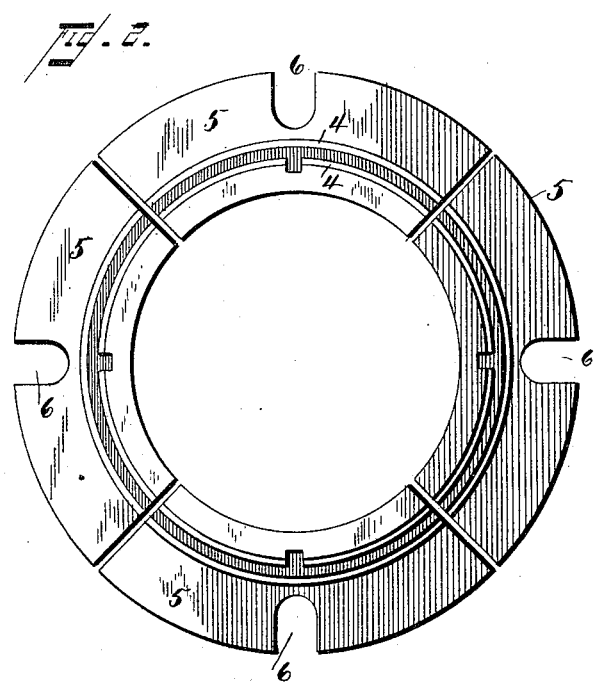
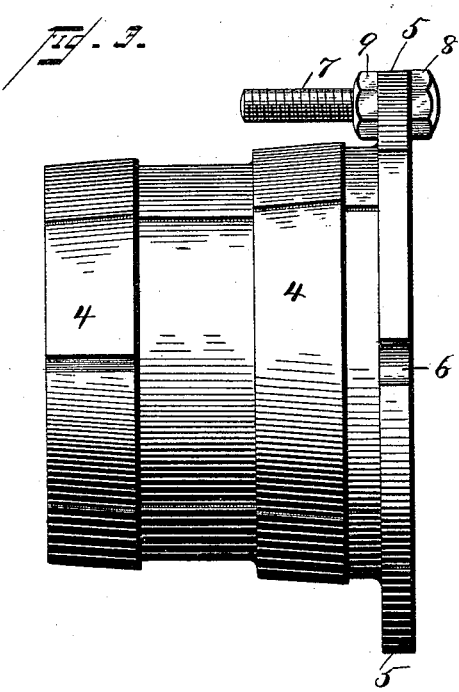
WITNESSES:
F. L. Ourand
Jo. L. Coombs
INVENTOR:
Conrad M. Conradson
by James Sagger & Co,
Attorneys

UNITED STATES PATENT OFFICE.

CONRAD M. CONRADSON, OF MADISON, WISCONSIN.

SECTIONAL JOURNAL-BOX.

SPECIFICATION forming part of Letters Patent No. 459,627, dated September 15, 1891.

Application filed January 6, 1891. Serial No. 376,837. (No model.)

*To all whom it may concern:*

Be it known that I, CONRAD M. CONRADSON, a citizen of the United States, and a resident of Madison, in the county of Dane and State of Wisconsin, have invented certain new and useful Improvements in Sectional Journal-Boxes; and I do hereby declare that the following is a full, clear, and exact description of the invention, which will enable others skilled in the art to which it appertains to make and use the same, reference being had to the accompanying drawings, which form a part of this specification.

My invention relates to sectional journal-boxes, the object being to provide an improved construction whereby the alignment of spindles in lathes, milling-machines, and other similar machines may be readily and accurately adjusted.

The invention consists in the novel construction and combination of parts hereinafter fully described, and definitely pointed out in the claims.

In the accompanying drawings, Figure 1 is a side elevation, partly in section, of a portion of an ordinary engine-lathe with my improvements applied thereto. Fig. 2 is an end elevation of the journal-box. Fig. 3 is a side elevation of the same.

In the said drawings, the reference-numeral 1 designates the front bearing, and 2 the rear bearing, in which the spindle 3 is supported. These bearings are provided with conical recesses, as shown, and the spindle 3, where it is journaled in bearing 2, is formed with a tapering or beveled annular flange or flanges 3$^a$, which are embraced by one of said recesses.

The numerals 4 4 designate a series of concavo-convex sections or segments, the outer or convex surfaces of which are made tapering or beveled, so that when the sections are placed together they form a journal-bearing conical upon its outer surface to correspond with the conical recess in the bearing 1. Each section is provided or formed with an outwardly-projecting flange or rim 5, having a peripheral slot or recess 6 at or near the center thereof, through which passes a set-screw 7, provided with a head 8 and a binding-nut 9. These screws fit in screw-threaded apertures 10 in the bearing 1.

The operation of the invention will be readily understood. The spindle being inserted in the bearing, the sections 4 are placed in position, as shown in Fig. 1. The screws 7 are then applied, which will hold the sections securely in place. If from any cause the spindle should be thrown out of alignment, it can readily be brought into proper position by longitudinally moving the said sections by tightening or loosening the binding-screws, as the case may be, and as said sections are entirely separate and independent of each other any inaccuracies in alignment of the spindle may be remedied.

It may here be stated that the invention is not designed as a substitute for good workmanship, but is intended to correct inaccuracies in alignment caused by wear.

In the drawings I have illustrated the box as being composed of four sections; but it is obvious that the number may be varied without departing from the principle of the invention.

Having thus described my invention, what I claim is—

1. The combination, with the journal boxes or bearings having conical recesses therein and the spindle provided at one end with annular beveled flange or flanges to engage with the recess in one of said boxes, of a series of longitudinally-adjustable concavo-convex sections having their outer faces beveled or tapering to correspond with the recess in the other box, and means, substantially as described, for adjustably securing said sections in place.

2. The combination, with a journal-bearing having a conical recess and a spindle passing therethrough, of a series of longitudinally-adjustable concavo-convex sections, the convex surfaces of which are tapering or beveled to correspond with the conical recess in the bearing, the outwardly-projecting flanges or rims having peripheral slots or recesses, the headed screws passed through said slots and engaging in screw-threaded apertures in the bearing, and the binding-nut on said screws, substantially as described.

In testimony that I claim the foregoing as my own I have hereunto affixed my signature in presence of two witnesses.

CONRAD M. CONRADSON.

Witnesses:
  J. HOGAN,
  W. H. EAVES.